Jan. 25, 1944.  G. A. WEINGARTNER  2,340,029
QUICK ACTION TOOL RESETTING MECHANISM
Filed Dec. 9, 1941  2 Sheets-Sheet 2
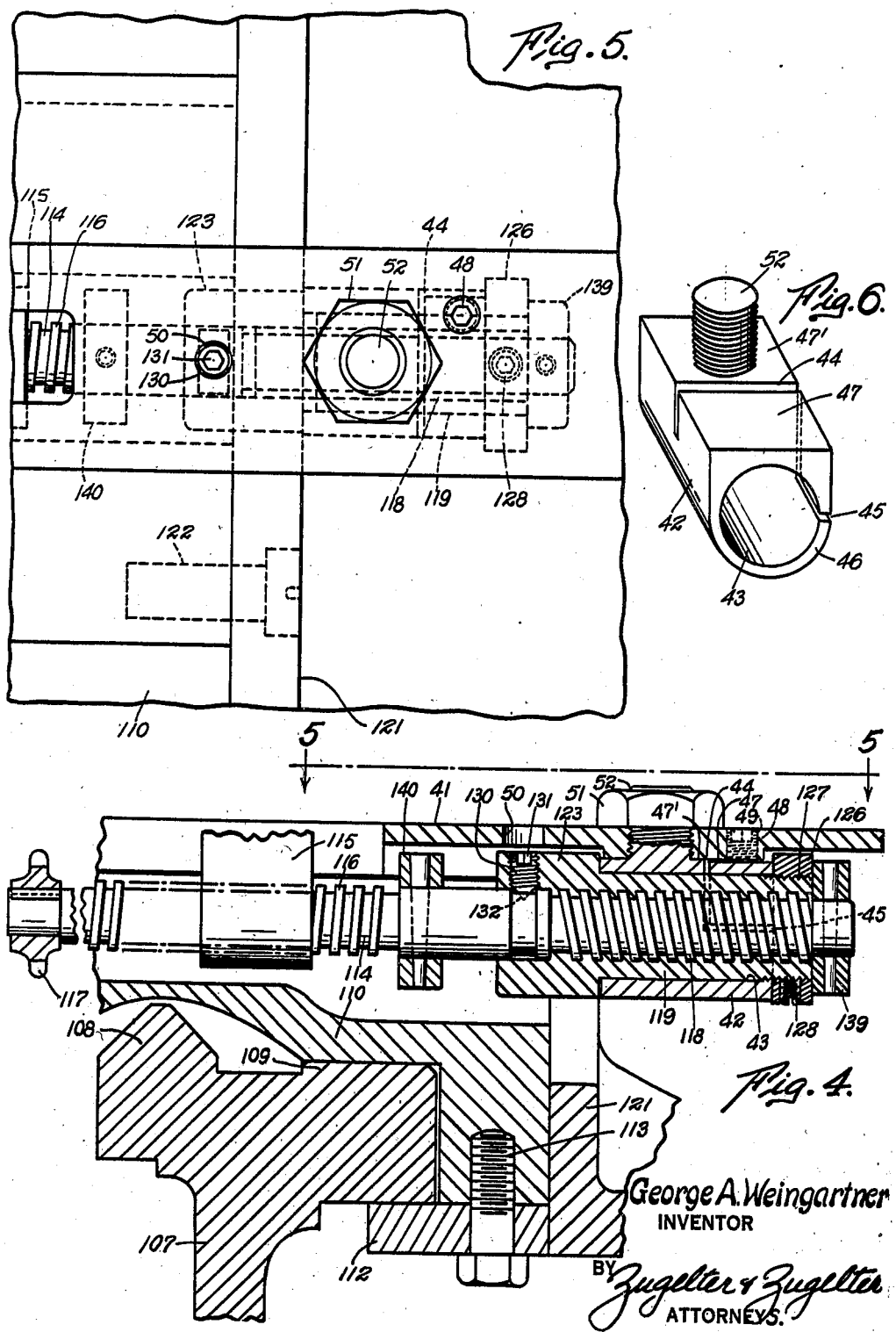
George A. Weingartner
INVENTOR
BY Zugelter & Zugelter
ATTORNEYS

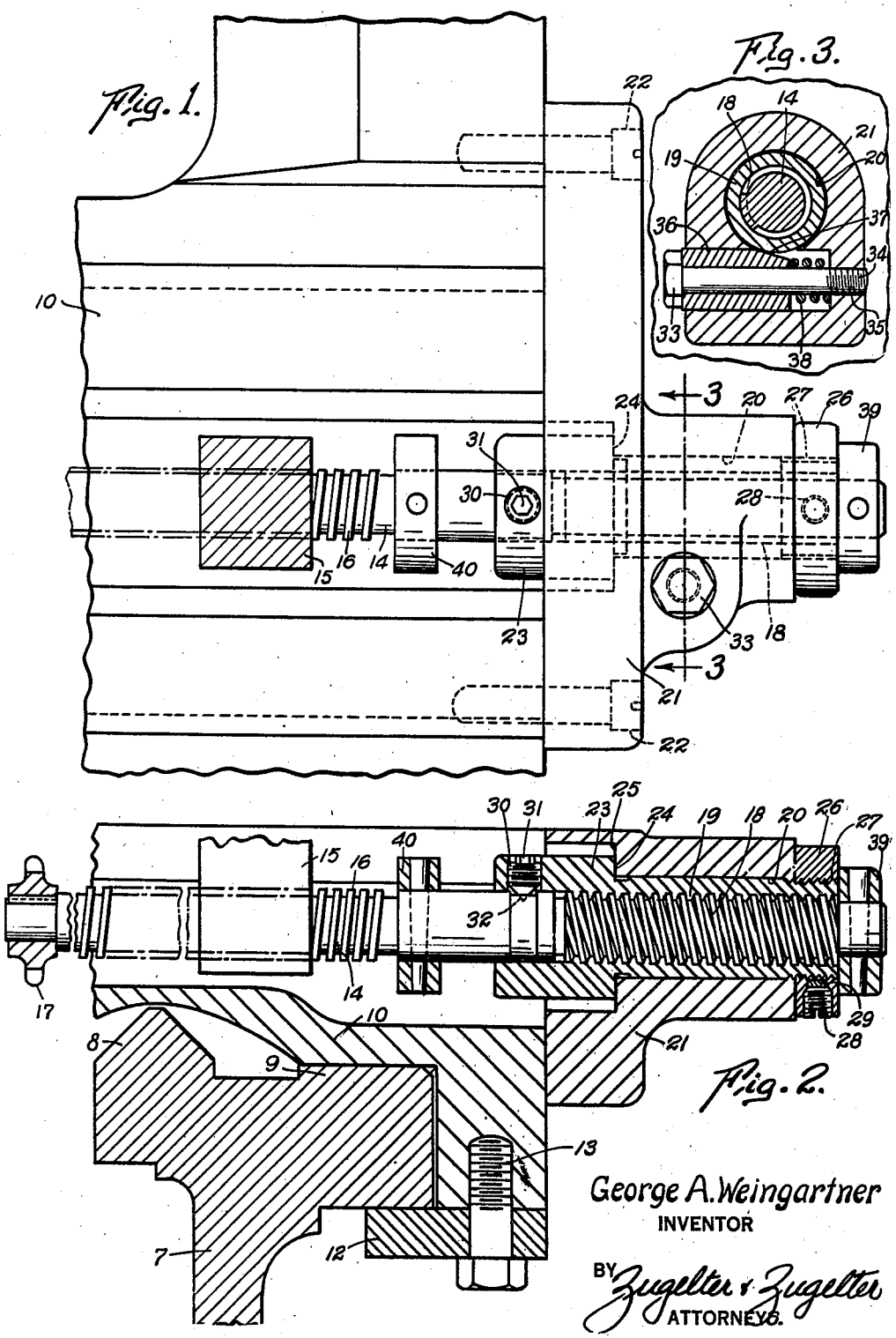

Patented Jan. 25, 1944

2,340,029

UNITED STATES PATENT OFFICE 2,340,029

QUICK-ACTION TOOL RESETTING MECHANISM

George A. Weingartner, Fort Thomas, Ky., assignor to The Bradford Machine Tool Company, Cincinnati, Ohio, a corporation of Ohio Application December 9, 1941, Serial No. 422,301

16 Claims. (Cl. 82—24)

The present invention relates to a quick-action tool resetting mechanism, such as might be applied to lathes or other types of machine tools in which a cutter or implement for shaping the work is repeatedly applied, to shape or finish the work in stages, or by means of successive operations, using the same tool or implement at different degrees of advancement toward the work.

When applied to a lathe carriage, as an example, the invention makes possible a quick retraction of the cutting tool from the work at the end of the cut, and an equally quick re-application of the tool to the work at the beginning of the next cut, and at the same cutting depth, without the aid of the index generally provided for resetting of the tool for subsequent cuts. By means of the invention, a rapid reapplication of the tool to the work is effected, with the previous depth of cut automatically re-established in order that any desired advanced cutting depth may be added for the next succeeding operation.

One object of the invention is to provide a quick action tool resetting mechanism for machine tools and the like, for the purpose of conserving time and effort in chasing operations.

Another object is to provide mechanism of the character stated, which is simple of construction and operation, as well as durable, accurate, and inexpensive.

A further object of the invention is to provide mechanism of the kind referred to, which may be applied either as an accessory to existing machines, or as a permanent fixture upon new machines, as may be desired. Use of the invention, moreover, will to a great extent eliminate breakage of tools and injury to the work through errors in tool resetting.

The foregoing and other objects are attained by the means described herein and disclosed in the accompanying drawings, which, by way of example, illustrate the invention as applied to a metal working lathe.

In the drawings:

Fig. 1 is a fragmental plan view of the tool carriage of a lathe, and embodying the invention.

Fig. 2 is a fragmental cross-section taken upon the axis of the feed screw shown in Fig. 1.

Fig. 3 is a fragmental cross-section taken on line 3—3 of Fig. 1, transversely of the screw.

Fig. 4 is a cross-sectional view similar to Fig. 2, illustrating a modification.

Fig. 5 is a fragmental plan view taken on line 5—5 of Fig. 4.

Fig. 6 is a perspective view of a seize bearing or lock piece, which forms a detail of the structure illustrated by Figs. 4 and 5.

While as previously stated herein the present invention is applicable to other types of machines, it will be disclosed and explained in connection with the tool feeding mechanism of a lathe, wherein the function of the invention may be most clearly understood. The conventional lathe comprises a bed 7 which includes usually two or more parallel rails extending lengthwise of the machine. One of such rails is indicated at 8 in Fig. 2. Extending in parallelism with the rail 8 is a carriage rail 9 which supports a main carriage 10 for sliding movement toward and from the head stock of the machine. The carriage is held in intimate contact with rail 9 by the block 12, which ordinarily is bolted to the carriage as at 13. A screw or other suitable means (not shown) customarily power-actuates the carriage along the rail 9.

The screw which is indicated at 14, is the cross-feed screw for advancing and retracting a tool relative to the work supported in the machine. A nut 15 engages the threads 16 of the cross-feed screw, this nut being fixed to the underside of a sub-carriage (not shown), which carries a tool holder. The tool holder usually has a vernier arrangement to advance and retract the tool independently of the cross-feed screw, as is well known.

In accordance with common practice, the cross-feed screw 14 includes suitable means for rotating it, and for this purpose an actuating device which may be in the form of a gear 17, may be keyed or splined to one end of the shaft. The opposite or rear end of the screw has associated therewith means for selective rapid advancement and retraction of the sub-carriage and the tool mounted thereon. Said means may comprise a thread 18, single or multiple as desired, having preferably a substantial lead so as to impart rapid linear movement to the screw when rotated within the internally threaded bearing or sleeve 19, when the latter is held stationary.

The threads 18 and 16 are shown as opposites, that is, one is a right hand thread and the other a left hand thread. By preference, though not of necessity, the thread at 16 is made the left hand thread in order that advancement of the tool holder nut 15 to the right will occur when the screw 14 is rotated in clockwise direction.

The internally threaded bearing or sleeve 19, it should be noted, may under certain circumstances rotate within the bore 20 of an end bracket 21 that is fixed to the main carriage 10, as by means of screws 22, (Fig. 1). An enlargement 23 at one end of the bearing or sleeve provides a shoulder 24 to abut a cooperative annular surface 25 of the bracket, to limit movement of the bearing or sleeve toward the outer end of the bracket bore. Longitudinal shifting of the bearing or sleeve in the opposite direction may be limited by mounting a collar 26 upon the outer end of the bearing or sleeve. The collar preferably is mounted adjustably upon the bearing or sleeve, to take up end play. The adjustable mounting may be of one kind or another, the drawings hereof showing by way of example a threaded connection 27 between the collar and the sleeve, with means in the form of a set screw 28 bearing upon a pad 29, to lock the adjustment.

From the foregoing explation, it should be evident that the internally threaded bearing or sleeve 19 is incapable of axial movement within the bore 20 of end bracket 21; however, as will presently be explained, this bearing or sleeve is adapted to be selectively clamped or released with respect to its rotative relationship to the end bracket. For example, referring to Fig. 2, means is provided in the form of a safety set screw 30 for fixing the bearing or sleeve to the cross-feed screw. The set screw, as shown at 30 of Fig. 1, may have a socket head 31 to accommodate a suitable wrench. The pointed end of the set screw may rest within a recess 32 of the shaft when seated. Thus, whenever the fastening device 30 is engaged, or operative, the sleeve or bearing element 19 must rotate with the cross-feed screw, and it will thereupon perform the simple function of providing a bearing for the rear end of the cross-feed screw so as to compel conventional back and forth travel of the carriage nut 15.

Now referring to Figs. 1 and 3, it will be shown that the mechanism includes means to clamp the bearing or sleeve 19 so that it may not rotate with the cross-feed screw. The clamping means may comprise a bolt 33 having its threaded end 34 in engagement with the threads of a tapped hole 35 in the bracket 21, so that by tightening the bolt by means of a wrench applied to the head thereof, a camming sleeve 36 will impinge upon the bearing element 19 and lock it against rotation within the bore 20 of the bracket. The impingement may be effected at an incline or camming area of the sleeve, as indicated at 37. If desired, a helical spring 38 or equivalent means may be provided to urge the sleeve 36 out of clamping relationship with the bearing element 19, upon loosening the bolt 33.

From the foregoing, it will be understood that the internally threaded bearing element 19 (Fig. 2), may be clamped to preclude rotation thereof within the bore 20, with the result that the cross-feed screw when rotated will be given a very decided linear movement by the pronounced lead of the screw threads 13. This movement is transmitted to the tool holder and tool through the nut 15, and accounts for the desired rapid advancing and retracting of the tool relative to the work.

The rapid linear or axial movement of the cross-feed screw as above explained, preferably is to be limited in extent. The limits of movement may be established in any suitable manner, such as by fixedly securing a stop collar 39 upon the free end of the screw, and another, as at 40, upon some intermediate portion of the screw. The distance between stop collars 39 and 40 will determine the travel of the cutting tool under the rapid advance-and-retract conditions of the mechanism, allowance being made, of course, for the lead of threads 16 within the nut 15.

In operating the device, it should be remembered that clamping means 30 should be loosened whenever the clamping means 33 is tightened, and vice versa.

Figs. 4, 5, and 6, are illustrative of a modified form of the invention such as may be employed in connection with a lathe equipped with a taper attachment. Many of the elements employed in the modification are identical to elements found in the apparatus of Figs. 1, 2 and 3, wherefore it is deemed feasible to identify them with closely similar reference characters. Accordingly, the corresponding elements of Figs. 4, 5 and 6 will bear the same reference characters prefixed with the numerals necessary to elevate them above one-hundred. Thus, the part 7 of Fig. 2 will correspond with the part 107 of Fig. 4; part 12 of Fig. 2 will correspond with the part 112 of Fig. 4, etc.

Referring now to Fig. 4, it will be observed that the right hand end of the cross-feed screw is supported upon a taper attachment bar indicated at 41, by means of a contractable bearing element 42, shown in detail by Fig. 6. The taper attachment bar, as usual, is mounted upon the main carriage 110 and moves therewith, along with the taper attachment bracket 121.

The contractable bearing element 42 may consist of a substantially cylindrical metal block bored as at 43 to receive the internally threaded bearing or sleeve 119. Element 42 may be slit as at 44, across its top and part way down its sides, one of the side slits being met by a terminal slit or slot 45 that extends lengthwise of the bore and reaches the end 46 of the element. The slit divides the block to furnish a seat area 47' and a pressure area 47, the latter being at an elevation slightly lower than the seat to afford freedom of expansion and contraction of the block at slot 45. By applying force to the pressure area 47 of part 42, the bore may be constricted so as to bind and clamp the internally threaded bearing or sleeve 119 against rotation within the bore 43. Such force may be applied in any convenient manner, for example, by means of a screw 48 which threadedly engages a tapped hole 49 in the taper attachment bar 41. This screw, while shown as one having a wrench-receiving socket instead of an angular head, may of course, be of any other type. When screw 130 is loosened and screw 48 is tightened against the flexible area 47 of the contractable bearing element 42, the internally threaded element 119 will be fixed and so will function as a stationary nut enforcing a pronounced axial movement of the cross-feed screw concurrently with rotation thereof. As in the structure of Fig. 2, the lead of the thread or threads 118 preferably is considerably greater than that of thread 116, and is opposite of rotation. The threads 118 may be single or multiple, as desired, so long as the lead thereof is pronounced.

Access to the bearing set screw 130 may be had through a hole 50 in the taper attachment bar 41. A nut 51 in threaded engagement with the upstanding threaded stud 52 of the contractable bearing element 42, mounts said element 42 stationarily upon the taper attachment bar, or upon any other stationary part of the main carriage that might be accessible for the purpose.

The stop collars 139 and 140, and the adjusting collar 126, all perform the functions ascribed to the corresponding element of Fig. 2.

From the foregoing, it will be understood that a machine may be equipped with the device of the invention, to speed its productiveness and to relieve the machine operator of the fatigue and strain that ordinarily are experienced in the work of resetting the cutting tool to the work after completing a cutting or chasing operation. With the means of the invention applied to the machine, the tool may easily and quickly be retracted from the work at one location, and reset to the work at another location, with accuracy and confidence, since the stop collars automatically determine the advancement and retraction of the tool. By means of the invention, the tool may be reset to the work without consulting any index or indicator, the sense of touch alone being sufficient to ensure proper and accurate resetting. The tool, after resetting as herein explained, may be advanced toward the work any desired distance by the simple expedient of using the separate vernier adjustment universally provided at the tool post of the machine.

To convert the machine to conventional operation, it is necessary only to fix the internally threaded bearing element or sleeve to the cross-feed screw by the application of a wrench, and thereby cause said element to function as a plain bearing rotating with the screw.

While in the preferred embodiment of the invention the threads of the cross-feed screw are right and left hand threads of different lead values, persons skilled in the art will appreciate that speed differentials of the nut 15, for example, will result even though the combination utilizes threads having a common lead value, since in that case the nut will advance at double speed when the sleeve or bearing element is clamped against rotation. A nut speed somewhat in excess of the normal speed imparted by the thread 16, will result even though the lead of thread 18 be less than that of thread 16. Conversely, the use of threads leading in a common direction, rather than oppositely, will effect a reduction instead of an increase in the nut speed when the sleeve or bearing element is clamped against rotation.

It is to be understood that various modifications and changes in the structural details of the device may be made, within the scope of the appended claims, without departing from the spirit of the invention.

What is claimed is:

1. A machine tool including a work support and a tool support having a tool for operating upon work held by the support, and comprising in combination therewith: a bed and a carriage slidable along the bed, a cross-feed screw supported for rotation transversely of the carriage movement, and means including a nut engaged with the cross-feed screw for advancing and retracting the tool support and the tool relative to the work, a single actuating means associated with one end of the cross-feed screw to impart rotation thereto and thereby axially move the nut, means including a threaded element upon the opposite end of the cross feed screw and normally rotatable with said screw to provide a bearing for said opposite end of the screw, and means to selectively fix said threaded element against rotation with the screw to induce axial movement of the screw as same is rotated by the single actuating means aforesaid.

2. A machine tool including a work support and a tool support having a tool for operating upon work held by the support, and comprising in combination therewith: a bed and a carriage slidable along the bed, a cross-feed screw supported for rotation transversely of the carriage movement, and means including a nut engaged with the cross-feed screw for advancing and retracting the tool support and the tool relative to the work, an actuating means associated with one end of the cross-feed screw to impart rotation thereto and thereby axially move the nut, and means including a member selectively fixable to and releasable from the cross-feed screw to increase the axial movement of the nut upon rotation of the cross-feed screw by the actuating means aforesaid.

3. A machine tool including a work support and tool support having a tool for operating upon work held by the support, and comprising in combination therewith: a bed and a carriage slidable along the bed, a cross-feed screw supported for rotation transversely of the carriage movement, and means including a nut engaged with the cross-feed screw for advancing and retracting the tool support and the tool relative to the work, an actuating means associated with one end of the cross-feed screw to impart rotation thereto and thereby axially move the nut, a thread of extensive lead value upon the cross-feed screw, and an internally threaded bearing element having its threads engaged with the extensive lead thread of the screw, mounting means movable with the carriage for rotatably supporting the internally threaded bearing element, means for selectively and alternatively fixing the internally threaded bearing element to the cross-feed screw or to the mounting means for said bearing element, whereby the cross-feed screw is compelled to move bodily axially through the internally threaded bearing element when the latter is fixed relative to the mounting means, and stop means for limiting said bodily axial movement of the cross-feed screw in at least one direction, to control the extent of movement of the tool advancing and retracting nut.

4. A machine tool including a work support and a tool support having a tool for operating upon work held by the support, and comprising in combination therewith: a bed and a carriage slidable along the bed, a cross-feed screw supported for rotation upon the carriage, and having a principal thread, means including a nut internally threaded and engaged with the threads of the cross-feed screw for normally advancing and retracting the tool support and the tool relative to the work upon rotation of the cross-feed screw, means under the control of an operator for rotating the cross-feed screw and thereby axially moving the nut therealong, a second thread on the cross-feed screw, said second thread being of extensive lead value and directionally opposite to the principal thread of the cross-feed screw, an internally threaded bearing element having its threads corresponding to and in engagement with the second thread aforesaid, mounting means movable with the carriage for rotatably supporting the internally threaded bearing element, means for selectively and alternatively fixing the internally threaded bearing element relative to the cross-feed screw or the mounting means of the bearing element, whereby the cross-feed screw is compelled to move bodily axially through the internally threaded bearing element when the latter is fixed relative to the mounting means, and stop means for limiting the bodily axial movement of the cross-feed screw.

5. A two-speed feed mechanism which comprises in combination: a base structure and a feed screw supported thereon for rotational movement, said screw having a principal thread formed thereon and a non-rotatable nut engaging the thread whereby rotation of the screw advances and retracts the nut, a second thread on the feed screw and having a greater lead value than the first mentioned principal thread, an internally threaded bearing member having a cylindrical outer bearing surface, the internal threads of said bearing member being in engagement with said second screw thread, whereby holding the internally threaded bearing member stationary while rotating the feed screw results in bodily axial movement of the feed screw, mounting means on the base structure for rotatably supporting the outer bearing surface of the internally threaded bearing member, and means for selectively and alternatively securing said bearing member relative to the feed screw or to the mounting means for the bearing member, for governing the movement of the nut along the principal thread of the feed screw.

6. A two-speed feed mechanism which comprises in combination: a base structure and a feed screw supported thereon for rotational movement, said screw having a principal thread formed thereon and a non-rotatable nut engaging the thread whereby rotation of the screw advances and retracts the nut, a second thread on the feed screw and having a lead value different from the lead value of the first mentioned principal thread, an internally threaded member carried by the feed screw and having its internal threads in engagement with said second screw thread, whereby holding the internally threaded member stationary while rotating the feed screw results in bodily axial movement of the feed screw, means for alternatively securing said internally threaded member relative to the feed screw or to the base structure aforesaid, for governing the movement of the nut along the principal thread of the feed screw, and stop means for limiting bodily axial movement of the feed screw through the internally threaded member.

7. A two-speed feed mechanism which comprises in combination: a base structure and a feed screw supported thereon for rotational movement, said screw having a principal thread formed thereon and a non-rotatable nut engaging the thread whereby rotation of the screw advances and retracts the nut, a second thread on the feed screw having a greater lead valve and an opposite direction of lead, to that of the first mentioned principal thread, an internally threaded bearing member having a cylindrical outer bearing surface, the internal threads of said bearing member being in engagement with said second screw thread, whereby holding the internally threaded bearing member stationary while rotating the feed screw results in bodily axial movement of the feed screw, mounting means on the base structure for rotatably supporting the outer bearing surface of the internally threaded bearing member, means for selectively and alternatively securing said bearing member relative to the feed screw or to the mounting means for the bearing member, for governing the movement of the nut along the principal thread of the feed screw, and stop means for limiting bodily axial movement of the feed screw through the internally threaded bearing member.

8. A two-speed feed mechanism which comprises in combination: a base structure and a feed screw supported thereon for rotational movement, said screw having a principal thread formed thereon and a non-rotatable nut engaging the thread whereby rotation of the screw advances and retracts the nut, a second thread on the feed screw, an internally threaded bearing member having a cylindrical outer bearing surface, the internal threads of said bearing member being in engagement with said second screw thread, whereby holding the internally threaded bearing member stationary while rotating the feed screw results in bodily axial movement of the feed screw, mounting means on the base structure for rotatably supporting the outer bearing surface of the internally threaded bearing member, and means for selectively and alternatively securing said bearing member relative to the feed screw or to the mounting means for the bearing member, for governing the movement of the nut along the principal thread of the feed screw.

9. A two-speed feed mechanism which comprises in combination: a base structure and a feed screw supported thereon for rotational movement, said screw having a principal thread formed thereon and a non-rotatable nut engaging the thread whereby rotation of the screw advances and retracts the nut, a second thread on the feed screw, an internally threaded member normally rotatable with the feed screw, the internal threads of said rotatable member being in engagement with said second screw thread, whereby holding the internally threaded member stationary while rotating the feed screw results in bodily axial movement of the feed screw, means for selectively maintaining said member in fixed relation to the base structure and releasing said member from rotation with the feed screw, for governing the movement of the nut along the principal thread of the feed screw, and stop means for limiting bodily axial movement of the feed screw through the internally threaded member.

10. A two-speed feed mechanism which comprises in combination: a base structure and a feed screw supported thereon for rotational movement, said screw having a principal thread formed thereon and a non-rotatable nut engaging the thread whereby rotation of the screw advances and retracts the nut, a second thread on the feed screw having an opposite direction of lead, to that of the first mentioned principal thread, an internally threaded bearing member having a cylindrical outer bearing surface, the internal threads of said bearing member being in engagement with said second screw thread, whereby holding the internally threaded bearing member stationary while rotating the feed screw results in bodily axial movement of the feed screw, mounting means on the base structure for rotatably supporting the outer bearing surface of the internally threaded bearing member, means for selectively and alternatively securing said bearing member relative to the feed screw or to the mounting means for the bearing member, for governing the movement of the nut along the principal thread of the feed screw, and stop means for limiting bodily axial movement of the feed screw through the internally threaded bearing member.

11. A two-speed feed mechanism which comprises in combination: a base structure and a feed screw supported thereon for rotational movement, said screw having a principal thread formed thereon and a non-rotatable nut engaging the thread whereby rotation of the screw advances and retracts the nut axially of the screw, a second thread on the feed screw, an internally threaded member having its internal threads in engagement with said second screw thread, whereby holding the internally threaded member stationary while rotating the feed screw results in bodily axial movement of the feed screw, and means for alternatively securing said internally threaded member relative to the base structure or to the feed screw, for governing the movement of the nut along the principal thread of the feed screw.

12. A machine tool including a work support and a tool support having a tool for operating upon work held by the support, and comprising in combination therewith: a bed and a carriage slidable along the bed, a cross-feed screw supported for rotation upon the carriage, and having a principal thread, means including a nut internally threaded and engaged with the threads of the cross-feed screw for normally advancing and retracting the tool support and the tool relative to the work upon rotation of the cross-feed screw, means under the control of an operator for rotating the cross-feed screw and thereby axially moving the nut therealong, a second thread on the cross-feed screw, said second thread being of extensive lead value and directionally opposite to the principal thread of the cross-feed screw, an internally threaded element rotatably mounted upon the cross-feed screw and having its threads corresponding to and in engagement with the second thread aforesaid, and means for alternatively fixing the internally threaded element relative to the carriage or to the cross-feed screw, whereby the cross-feed screw is compelled to move bodily axially through the internally threaded element when the latter is fixed relative to the carriage.

13. A machine tool including a work support and a tool support having a tool for operating upon work held by the support, and comprising in combination therewith: a bed and a carriage slidable along the bed, a cross-feed screw supported for rotation upon the carriage, and having a principal thread, means including a nut internally threaded and engaged with the threads of the cross-feed screw for normally advancing and retracting the tool support and the tool relative to the work upon rotation of the cross-feed screw, means under the control of an operator for rotating the cross-feed screw and thereby axially moving the nut therealong, a second thread on the cross-feed screw, an internally threaded element rotatably mounted upon the cross-feed screw and having its threads corresponding to and in engagement with the second thread aforesaid, and means for alternatively fixing the internally threaded element relative to the carriage or to the cross-feed screw, whereby the cross-feed screw is compelled to move bodily axially through the internally threaded element when the latter is fixed relative to the carriage.

14. In a machine tool having a carriage, a cross-feed screw supported for rotation upon said carriage, means including a nut engaged with the cross-feed screw for advancing and retracting the carriage relative to a work piece, a single actuating means associated with one end of the cross-feed screw to impart rotation thereto and thereby axially move the nut, means including a threaded element upon the cross-feed screw and normally rotatable with said screw to provide a bearing for said screw, means to selectively fix said threaded element against rotation with the screw to induce axial movement of the screw as same is rotated by the single actuating means aforesaid, and stop means on the screw limiting the extent of said axial movement of the screw.

15. In a machine tool having a carriage, a cross-feed screw supported for rotation upon said carriage, means including a nut engaged with the cross-feed screw for advancing and retracting the carriage relative to a work piece, a single actuating means associated with one end of the cross-feed screw to impart rotation thereto and thereby axially move the nut, means including a threaded element upon the cross-feed screw and normally rotatable with said screw, and means to selectively fix said threaded element against rotation with the screw to induce axial movement of the screw as same is rotated by the single actuating means aforesaid.

16. In a machine tool having a carriage, a cross-feed screw supported for rotation upon said carriage, means including a nut engaged with the cross-feed screw for advancing and retracting the carriage relative to a work piece, a single actuating means associated with one end of the cross-feed screw to impart rotation thereto and thereby axially move the nut, a threaded element upon the cross-feed screw and so arranged relative thereto as to be fully rotatable therewith, and means to selectively fix said threaded element against rotation with the screw, to induce axial movement of the screw and thereby modify movement of the nut and carriage, as the screw is rotated by the single actuating means aforesaid.

GEORGE A. WEINGARTNER.